United States Patent
Schumann

(10) Patent No.: US 12,422,671 B2
(45) Date of Patent: Sep. 23, 2025

(54) OBLIQUE PLANE MICROSCOPE AND METHOD FOR CORRECTING AN ABERRATION IN AN OBLIQUE PLANE MICROSCOPE

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 207 days.

(21) Appl. No.: 17/788,783

(22) PCT Filed: Jan. 9, 2020

(86) PCT No.: PCT/EP2020/050425
§ 371 (c)(1),
(2) Date: Jun. 24, 2022

(87) PCT Pub. No.: WO2021/139889
PCT Pub. Date: Jul. 15, 2021

(65) Prior Publication Data
US 2023/0035107 A1 Feb. 2, 2023

(51) Int. Cl.
*G02B 27/00* (2006.01)
*G02B 21/00* (2006.01)
(Continued)

(52) U.S. Cl.
CPC ..... *G02B 27/0068* (2013.01); *G02B 21/0032* (2013.01); *G02B 21/025* (2013.01);
(Continued)

(58) Field of Classification Search
None
See application file for complete search history.

(56) References Cited

U.S. PATENT DOCUMENTS 6,005,710 A * 12/1999 Pensel ............... G02B 21/0012
250/201.3
8,582,203 B2   11/2013 Dunsby
(Continued)

FOREIGN PATENT DOCUMENTS

DE   102019102330 B3   6/2020
JP      2015102694 A    6/2015
(Continued)

OTHER PUBLICATIONS

Yazdanfar et al., "Simple and robust image-based autofocusing for digital microscopy," Jun. 9, 2008 / vol. 16, No. 12 / Optics Express, pp. 8670-8677. (Year: 2008).*

(Continued)

*Primary Examiner* — Hung Q Dang
(74) *Attorney, Agent, or Firm* — LEYDIG, VOIT & MAYER, LTD.

(57) ABSTRACT

An oblique plane microscope includes an optical imaging system configured to form an image of an object. The optical imaging system includes a telescope system with an optical zoom system, which is adjustable for adapting a magnification of the telescope system to a ratio between two refractive indices, one of which being associated with an object side of the telescope system and the other being associated with an image side of the telescope system. The oblique plane microscope further includes a control unit. The control unit is configured to evaluate an image quality of the image formed by the optical imaging system and to adjust the optical zoom system based on the evaluation.

10 Claims, 6 Drawing Sheets

(51) Int. Cl.
  *G02B 21/02*  (2006.01)
  *G02B 21/36*  (2006.01)
  *G06T 7/00*  (2017.01)
  *H04N 23/69*  (2023.01)

(52) U.S. Cl.
  CPC .......... *G02B 21/367* (2013.01); *G06T 7/0002* (2013.01); *H04N 23/69* (2023.01); *G06T 2207/10056* (2013.01); *G06T 2207/30168* (2013.01)

(56) References Cited

U.S. PATENT DOCUMENTS

| | | | | |
|---|---|---|---|---|
| 9,439,565 | B1* | 9/2016 | Chai | G16H 30/20 |
| 10,146,041 | B1* | 12/2018 | Putman | G02B 7/38 |
| 2003/0103277 | A1* | 6/2003 | Mohwinkel | H04N 23/55 |
| | | | | 348/E5.025 |
| 2008/0007733 | A1* | 1/2008 | Marks | G02B 27/58 |
| | | | | 356/477 |
| 2008/0218714 | A1* | 9/2008 | Uehara | G03F 7/70258 |
| | | | | 355/53 |
| 2016/0327779 | A1 | 11/2016 | Hillman | |
| 2018/0031816 | A1 | 2/2018 | Shimada | |
| 2018/0288292 | A1* | 10/2018 | Moggridge | G01J 3/0289 |
| 2019/0049708 | A1* | 2/2019 | Erlbacher | G02B 21/06 |
| 2019/0049711 | A1 | 2/2019 | Schumann | |
| 2019/0302437 | A1* | 10/2019 | Hillman | G02B 21/0032 |
| 2020/0371329 | A1* | 11/2020 | Almogy | G01N 1/28 |
| 2022/0091411 | A1 | 3/2022 | Lotter et al. | |

FOREIGN PATENT DOCUMENTS

| | | |
|---|---|---|
| JP | 2018017970 A | 2/2018 |
| JP | 2019505856 A | 2/2019 |
| WO | WO 2015/109323 A2 | 7/2015 |
| WO | 2017144442 A1 | 8/2017 |

OTHER PUBLICATIONS

E. J. Botcherby, et al., "An optical technique for remote focusing in microscopy," Opt. Com. 281, 880-887 (2008), Elsevier, Netherlands, Feb. 15, 2008.

Florian O. Fahrbach et al.: "Rapid 3D light-sheet microscopy with a tunable lens," Optics Express, vol. 21, No. 18, Aug. 30, 2013, p. 21010-21026, XP055089699, US.

Voleti Venkatakaushik et al.: "Real-time volumetric microscopy of in vivo dynamics and large-scale samples with SCAPE 2.0" and "Supplementary Notes—SCAPE 2.0 Optical resolution characterization," Nature Methods, Nature Pub. Group, NY, US, vol. 16, No. 10, Sep. 27, 2019, pp. 1054-1062, XP036887832.

* cited by examiner

OBLIQUE PLANE MICROSCOPE AND METHOD FOR CORRECTING AN ABERRATION IN AN OBLIQUE PLANE MICROSCOPE

CROSS REFERENCE TO RELATED APPLICATIONS

This application is a U.S. National Phase application under 35 U.S.C. § 371 of International Application No. PCT/EP2020/050425, filed on Jan. 9, 2020. The International Application was published in English on Jul. 15, 2021 as WO 2021/139889 A1 under PCT Article 21(2).

FIELD

Embodiments of the invention relate to an oblique plane microscope, and to a method for correcting an aberration in an oblique plane microscope.

BACKGROUND

Oblique plane microscopy, described for example in document U.S. Pat. No. 8,582,203 B2, is a technique for volumetric imaging of a specimen by means of a light sheet. The light sheet is directed into the specimen by an objective and illuminates a plane that is tilted with respect to the focal plane of said objective. Accordingly, most parts of the illuminated plane are outside the focal plane of the objective and are thus subject to defocus aberrations.

In order to achieve fast and aberration free imaging of the illuminated plane, a method called remote focusing is used which is described in E. J. Botcherby, et al., "An optical technique for remote focusing in microscopy," Opt. Com. 281, 880-887 (2008). This method makes use of a telescope system. In order to correct the above-mentioned defocus aberrations, the magnification of the telescope system is set to a ratio of two refractive indices, one of which being associated with an object side of the telescope system and the other being associated with an image side of the telescope system. If this condition is met, the image of the illuminated plane is free from defocus aberration.

Another factor contributing to the quality of an image formed by the oblique plane microscope are spherical aberrations, which occur as a result of inhomogeneities in an object to be imaged or refractive index mismatch. These spherical aberrations can be corrected by adjustable optical correction means, e.g. a correction lens. However, these two factors are not independent of each other. Adjusting the optical correction means might move the focal plane of the optical imaging system, for example. A proper adjustment of the optical correction means can be performed, if the imaging depth into the specimen and the refractive index of the specimen are known. Additionally, adjusting the magnification of the optical zoom system requires knowledge of the two refractive indices, on the object side and on the image side, respectively.

SUMMARY

Embodiments of the present invention provide an oblique plane microscope. The oblique plane microscope includes an optical imaging system configured to form an image of an object. The optical imaging system includes a telescope system with an optical zoom system, which is adjustable for adapting a magnification of the telescope system to a ratio between two refractive indices, one of which being associated with an object side of the telescope system and the other being associated with an image side of the telescope system. The oblique plane microscope further includes a control unit. The control unit is configured to evaluate an image quality of the image formed by the optical imaging system and to adjust the optical zoom system based on the evaluation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

Hereinafter, specific embodiments are described referring to the drawings, wherein.

DETAILED DESCRIPTION

Figure 1:
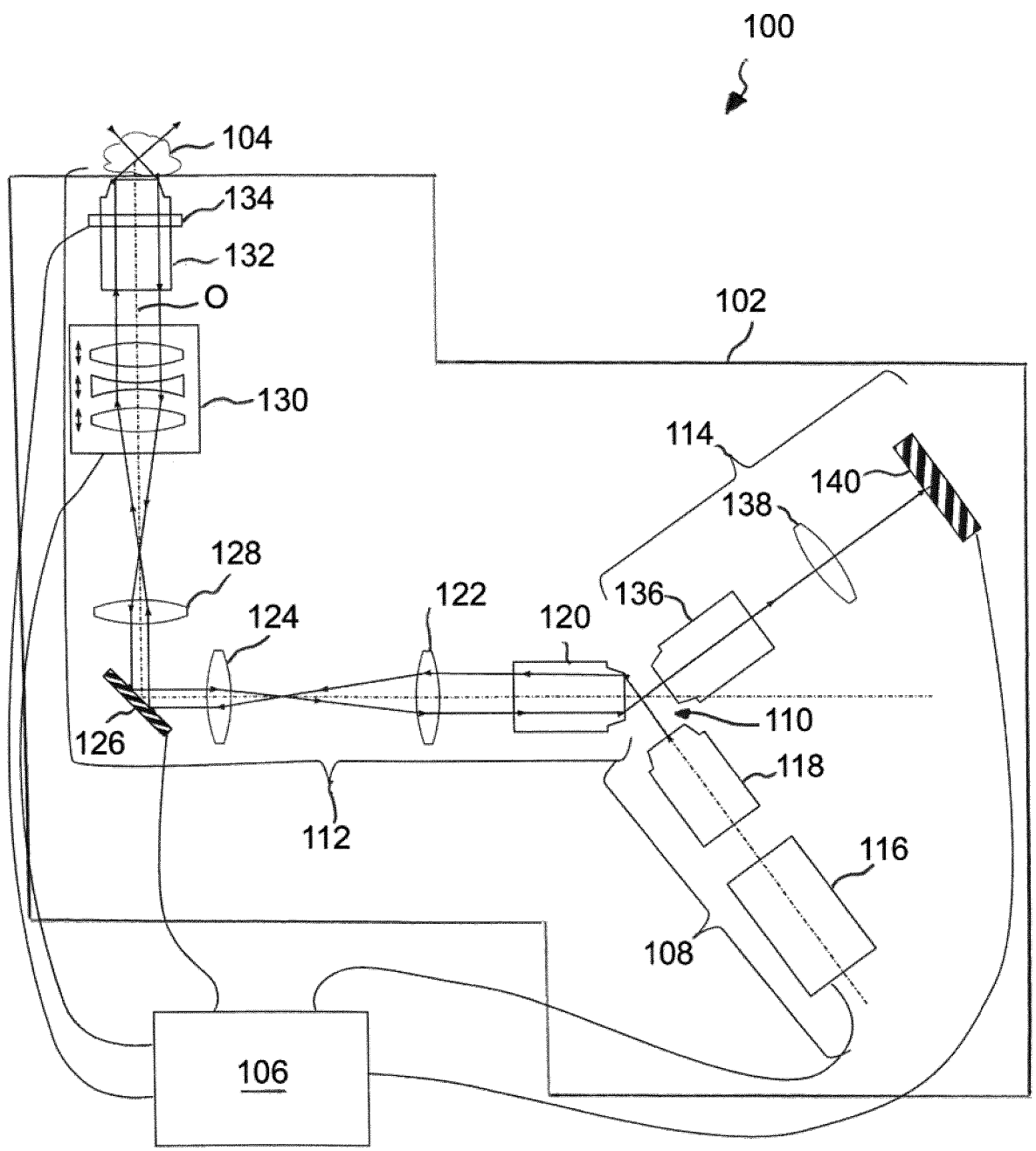
FIG. 1 shows a schematic diagram of an oblique plane microscope according to an embodiment.

An oblique plane microscope comprises an optical imaging system configured to form an image of an object. The optical imaging system comprises a telescope system with an optical zoom system, which is adjustable for adapting the magnification of the telescope system to a ratio between two refractive indices, one of which being associated with an object side of the telescope system and the other being associated with an image side of the telescope system. The oblique plane microscope further comprises a control unit being configured to evaluate an image quality of the image formed by the optical imaging system and to adjust the optical zoom system based on said evaluation.

Both conventional spherical aberrations and spherical aberrations due to a breakdown of the remote focusing condition (from here on denoted defocus aberrations, not to be confused with defocus aberrations in a centered optical system without remote focusing) have a characteristic influence on the quality of the image formed by the optical imaging system. Defocus aberrations manifest themselves as a position depended coma in the image formed by the optical imaging system. The coma will be more pronounced in areas of the image corresponding to regions of the object that are more out of focus, i.e. would require more remote focusing. Therefore, defocus aberrations have a greater impact on the image quality in image areas that are more distant from image areas corresponding to the focal plane of the optical imaging system in the image. On the other hand, spherical aberrations, e.g. due to refractive index mismatch, are mainly position independent, given that the imaging depth into the specimen is large compared to the amount of remote focusing required for imaging the field of view. Thus, spherical aberrations have a relatively homogeneous impact on the image quality. It is therefore possible to distinguish and determine the types of aberration present in the image by evaluating image quality.

The control unit of the oblique plane microscope is configured to evaluate the image quality and to adjust the optical zoom system based on said evaluation. Most notably, no measurement of the two refractive indices is needed in order to adapt the magnification of the telescope system to a ratio between both refractive indices. Such a measurement would have to be performed either in advance, which is time consuming and unreliable since conditions in situ, i.e. inside the microscope sample space where the object is located, are different from conditions ex situ, i.e. outside the microscope. On the other hand, measuring both refractive indices in-situ requires additional microscope components. Thus, the oblique plane microscope described herein is able to correct spherical aberrations and defocus aberrations fast and easily.

In a preferred embodiment, the telescope system comprises optical correction means which is adjustable for correcting a spherical aberration of the optical imaging system. The control unit is configured to adjust the optical correction means based on the evaluation of the image quality of the image. This allows to correct conventional spherical aberrations, e.g. due to refractive index mismatch. Thereby the overall quality of the image formed by the optical system is further increased.

In another preferred embodiment, the telescope system comprises an objective arranged at an object side of the telescope system. The control unit is configured to divide the image formed by the oblique plane microscope into two or more areas. A first area comprises an image of a first region and a second area comprises an image of a second region. The first region and the second region of the object are positioned at different distances from the objective along its optical axis.

Preferably, the control unit is configured to divide the image formed by the oblique plane microscope into three or more areas. The first area comprises an image of the first region of the object, said first region being located on a side of a focal plane of the objective facing away from objective. The second area comprises an image of the second region of the object, said second region being located on a side of the focal plane facing the objective. A third area comprises an image of a third region of the object, said third region being intersected by the focal plane.

The defocus aberrations affect different parts of the image that correspond to the first region and the second region of the object differently, since these object regions are located at different depth within the object, i.e. at different distances from the focal plane of the objective. This fact is exploited by dividing the image into two or more areas. For example, the magnification of the optical zoom system might be adjusted based on one of the areas corresponding to a region more distant from the focal plane of the objective. The correction means on the other hand might be adjusted based on an evaluation of the image quality of an area which is closer to the focal plane and thus subject to little or no interfering defocus aberrations. Therefore, dividing the image into two or more areas and evaluating the image quality of at least one of the areas allows for an adjustment of the optical correction means and the optical zoom system based on said evaluation. This means a better correction of the spherical aberrations and the defocus aberrations which increases the overall quality of an image created by the oblique plane microscope according to this preferred embodiment.

In another preferred embodiment, the control unit is configured to evaluate an image quality of the third area of the image and to adjust the optical correction means on said evaluation. The third area is intersected by the focal plane. Thus, the third area is subject to little or no defocus aberrations. This means that nearly all aberrations affecting the image quality of the image of the third area are caused by spherical aberrations. By, adjusting the optical correction means such that e.g. the image quality of the third area is maximized, a fast correction of the spherical aberrations present in the image formed by the optical imaging system is achieved.

In another preferred embodiment, the control unit is configured to evaluate an image quality of the first area and/or the second area, and to adjust the optical zoom system means based on said evaluation. The first and second areas each correspond to regions of the object which are not intersected by the focal place, respectively. The first and second areas are therefore subject to defocus aberrations. Adjusting the magnification of the optical zoom system such, that e.g. the image quality of the first area and/or the second area is maximized, will result in a fast correction of the defocus aberrations present in the image formed by the optical imaging system.

In another preferred embodiment, the control unit is configured to evaluate the image quality by determining a Strehl ratio (image intensity), a contrast value, an image sharpness measure and/or a width of an autocorrelation function of the image.

It is advantageous to configure the control unit for determining a direction dependent image quality of the first area and/or the second area. The first area and the second area each include parts of the image that correspond to regions of the object on different sides of the focal place. The coma induced by defocus aberrations is oriented in the first area in a manner different from the coma in the second area. Since the coma depends on direction, the control unit can reliably identify the coma based on an evaluation of the direction dependent image quality.

In another preferred embodiment, the optical zoom system is configured to render the telescope system telecentric over the entire magnification range with respect to both the object side and the image side. This means that the position of a pupil of the optical zoom system is fixed even if the magnification of the optical zoom system is adjusted. Thus, the focal plane of the optical imaging system is always imaged onto the same image plane. This allows for volumetric imaging without the need for additional components for detecting different image planes or for correcting the position of said pupil plane.

In another preferred embodiment, the magnification range of the telescope system corresponds to a range in which the ratio of the two refractive indices is between 1.0 and 1.6. This allows for a wide variety of combinations of objectives, cover slips, and samples to be used in combination with the oblique plane microscope according to this preferred embodiment, and also to compensate for manufacturing tolerances of the optical components of the telescope system, which manifest in a tolerance of the magnification.

In another preferred embodiment, the telescope system is formed by a Keplerian telescope comprising the optical zoom system.

In another preferred embodiment, the control unit is configured to evaluate an image quality of the image formed by the optical imaging system and to adjust the optical correction means and the optical zoom system based on said evaluation in an iterative process. Adjusting the optical correction means and the optical zoom system is an optimization problem. One or more parameters are maximized (or minimized) with respect to a setting of the correction means and with respect to the magnification of the optical zoom system. The parameters correspond to the image quality of the image formed by the optical imaging system and/or the image quality of one or more areas of said image. The setting of the correction means may be a position of the correction lens along the optical axis of the optical imaging system, for example.

This optimization problem can be solved fast with iterative methods know from the prior art.

The correction means may be configured such, that adjusting the correction means does not affect the position of the focal plane of the optical imaging system. Such a correction means is known e.g. from the document DE 10 2019 102 330. In this advantageous embodiment, adjusting the correction means does not introduce additional (conventional) defocus aberrations, i.e. does not shift the object plane along the optical axis. This means, the volume of the object imaged is invariant under adjustment of the correction means, making the analysis of the image quality more robust and thus facilitating an image-based adjustment of the correction means.

According to another aspect, a method for correcting an aberration in an oblique plane microscope is provided. The method comprising evaluating an image quality of the image formed by an optical imaging system of the oblique plane microscope and adjusting optical correction means and an optical zoom system of the oblique plane microscope based on said evaluation.

The method has the same advantages as the oblique plane microscope and can be supplemented using the features described herein with reference to the microscope.

DETAILED DESCRIPTION

FIG. 1 shows a schematic diagram of an oblique plane microscope 100 according to an embodiment. The oblique plane microscope 100 comprises an optical imaging system 102 configured to form an image of an object 104 and a control unit 106.

The optical imaging system 102 comprises an illumination system 108 and a telescope system 112. The illumination system 108 is configured to form a light sheet in an intermediate image space 110. The telescope system 112 is configured to form an image of the light sheet within the object 104 and to form an image 300 (see FIG. 3) of an object plane 204 (see FIG. 2) within the object 104 in the intermediate image space 110. The oblique plane microscope 100 further comprises an optical detection system 114 configured to detect the image 300 formed by the telescope system 112. In an alternative embodiment, the light sheet may be guided into the object 104 by a dichroic beam splitter arranged in telescope system 112.

The illumination system 108 comprises a light sheet forming unit 116 configured to form the light sheet. The light sheet forming unit 116 comprises a light source, in particular laser light source, and light sheet forming elements, for example a cylindrical lens or a scanning element. The illumination system 108 further comprises an illumination objective 118 configured to direct the light sheet into the intermediate image space 110.

The telescope system 112 forms an optical transport system in the sense that it is configured to transport the light sheet from the intermediate image space 110 into the object 104 and to create the image 300 of the object plane 204 illuminated by the light sheet in the intermediate image space 110. In other words, the telescope system 112 transports illumination light and detection light from the intermediate image space 110 to the object 104 and back, respectively.

In the present embodiment, the telescope system 112 is telecentric and formed by a Keplerian telescope system. The telescope system 112 comprises an image side objective 120, a tube lens 122, a first ocular 124, scanning element 126, a second ocular 128, an optical zoom system 130, and an object side objective 132, in this order from the intermediate image space 110.

The scanning element 126 is configured to move the light sheet through the object 104 along a direction perpendicular to the optical axis O of the objective 132. The optical zoom system 130 is configured adjustable for adapting the magnification of the telescope system 112 to a ratio between two refractive indices. One refractive index is associated with the object side of the telescope system 112 and the other refractive index is associated with the image side of the telescope system 112. More specifically, the refractive index associated with the object side of the telescope system 112 is the refractive index of the object 104, and the refractive index associated with the image side of the telescope system 112 is the refractive index of an optical medium, e.g. air, being present within the intermediate image space 110. In the present embodiment, the magnification range of the optical zoom system 130 corresponds to a range in which the ratio of the refractive indices is between 1.0 and 1.6. The objective 132 comprises correction means 134, for example a movable correction lens, configured to correct a spherical aberration of the optical imaging system 102. In another embodiment, the corrections means 134 may be arranged in the image side objective 120 instead.

The optical detection system 114 comprises a detection objective 136, a tube lens 138, and a detector element 140. The detection objective 136 and the tube lens 138 are configured to image the intermediate image space 110 onto the detector element 140. This means that the image 300 of the object plane 204 formed by the telescope system 112 within the intermediate image space 110 is object onto the detector element 140. Thus, the image 300 is detected by the detector element 140. In an alternative embodiment, the detection objective 136 may be configured as an objective with a finite conjugate length. In this alternative embodiment, the optical detection system 114 does not comprise the tube lens 138. In another embodiment, the detection objective 136 may comprise concentric front lenses configured to correct spherical aberrations. In another embodiment, the role of detection objective 136 may be fulfilled by the image side objective 120 and a mirror and beam splitting arrangement, as known from prior art.

The control unit 106 is connected to the correction means 134, the optical zoom system 130, the scanning element 126, the detector element 140, and the light sheet forming unit 116. The control unit 106 is configured to control the aforementioned elements of the oblique plane microscope 100. Further, the control unit 106 is configured to divide the image 300 of the object plane 204 formed by the optical imaging system 102 into three areas 302, 304, 306 (see FIG. 3) each of these areas 302, 304, 306 corresponding to a different region 206, 208, 210 (see FIG. 2) of the object 104. These three areas 302, 304, 306 and the three regions 206, 208, 210 of the object 104 are described in more detail below with reference to FIGS. 2 and 3. The control unit 106 is further configured to evaluate an image quality of the image 300 and/or an image quality of the three areas 302, 304, 306 and to adjust the optical correction means 134 and the optical zoom system 130 based on said evaluation. The adjustment based on the evaluation of the image quality will be described in more detail below with reference to FIG. 4.

Figure 2:
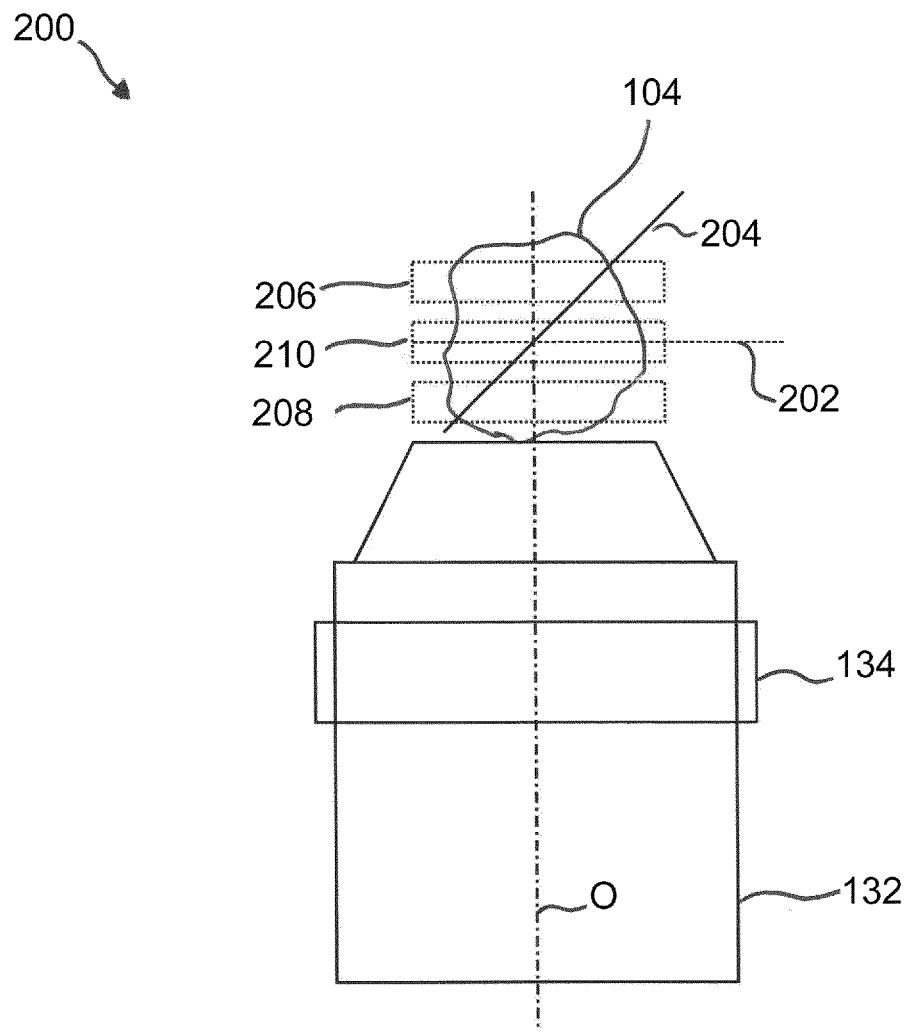
FIG. 2 shows a schematic diagram of an object side end of an optical imaging system of the oblique plane microscope according to FIG. 1.

FIG. 2 shows a schematic diagram of an object side end 200 of the optical imaging system 102 of the oblique plane microscope 100 according to FIG. 1. The optical axis O of the objective 132 of the telescope system 112 is illustrated in FIG. 2 as a dash-dotted line. The focal plane 202 of the objective 132 is shown in FIG. 2 is a dashed line. The position of the object plane 204 is shown in FIG. 2 as a solid line.

A first region 206 of the aforementioned three regions is located on a side of the focal plane 202 facing away from the objective 132. A second region 208 is located on a side of the focal plane 202 facing the objective 132. A third region 210 is being intersected by the focal plane 202 of the objective 132. Accordingly, the three regions 206, 208, 210 are located at different distances from the objective 132 along the optical axis O thereof. In other words, the three regions 206, 208, 210 are located at different depths within the object 104.

Figure 3:
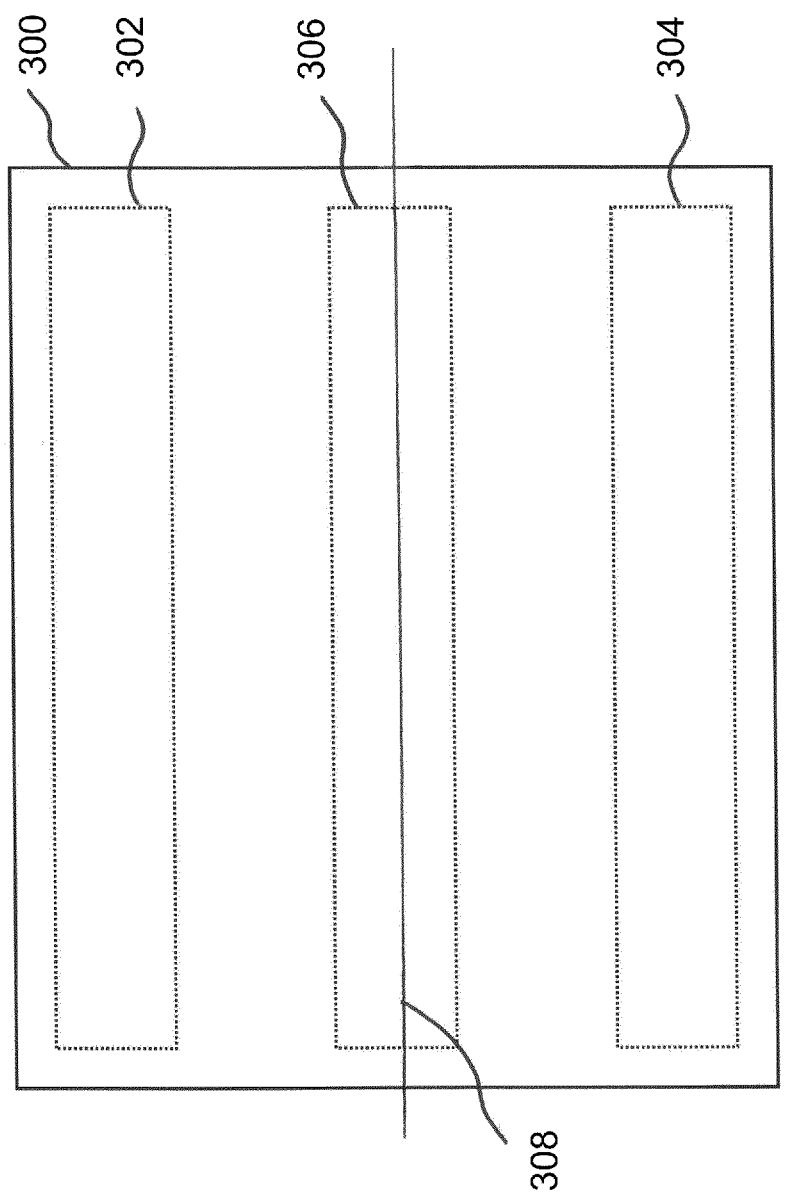
FIG. 3 shows a schematic diagram of an image formed by the optical imaging system of the oblique plane microscope according to FIG. 1.

FIG. 3 shows a schematic diagram of the image 300 of the object plane 204 formed by the optical imaging system 102. The image 300 is divided into the three areas. A first area 302 corresponds to the first region 206, a second area 304 corresponds to the second region 208, and a third area 306 corresponds to the third region 210 of the object 104. As can be seen in FIG. 3, the three areas 302, 304, 306 do not cover the complete image 300. In the present embodiment, the three areas 302, 304, 306 are rectangular. However, the three area may have any other suitable shape.

The first and second regions 206, 208 of the object 104 are not intersected by the focal plane 202 of the objective 132. Thus, the areas 302, 304 of the image 300 corresponding to the first and second regions 206, 208 are subject to defocus aberrations. The defocus aberrations manifest themselves as coma in the image 300. The amount of coma depends on the position with respect to a line 308 in the image 300 corresponding to the focal plane 202 of the objective 132. The amount of coma further depends on the mismatch between the magnification of the telescope system 112 and the ratio between the two refractive indices. Thus, the more distant the first and second regions 206, 208 are located from the focal plane 202 of the objective 132, the stronger the coma will be in the first and second areas 302, 304. The coma due to defocus aberrations lowers the image quality within the first and second regions 206, 208.

In contrast, the third region 210 is being intersected by the focal plane 202 and thus mostly in focus. Consequently, the third area 306 of the image associated with the third region 210 is not subject to defocus aberrations. However, the third region 210 is subject the spherical aberrations, e.g. due to refractive index mismatch, affecting the image quality in all areas of the image 300 equally.

In order to correct both defocus aberrations and spherical aberrations, the control unit 106 is configured to adjust the optical correction means 134 and the optical zoom system 130 based on the evaluation of the image quality. This process in described in the following with reference to FIG. 4.

Figure 4:
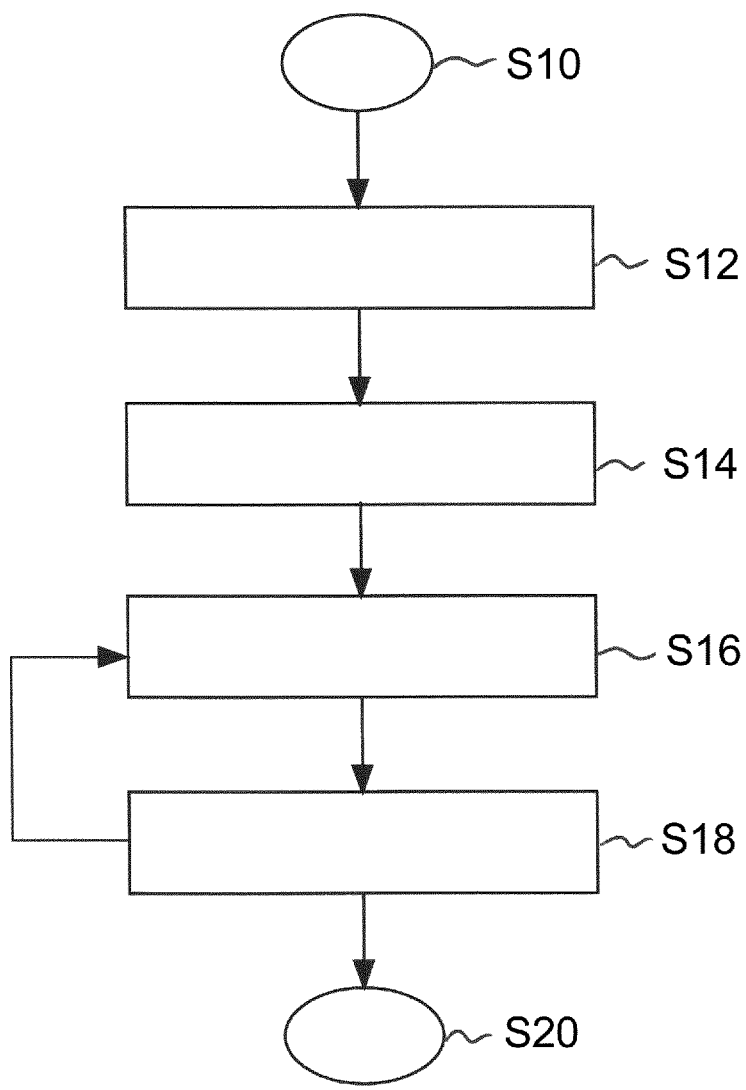
FIG. 4 is a flowchart of a process for correcting defocus aberrations and a spherical aberrations with the oblique plane microscope according to FIG. 1.

FIG. 4 is a flowchart of a process for correcting the defocus aberrations and the spherical aberrations using the oblique plane microscope 100 according to FIG. 1.

The process starts in step S10. In step S12 the image 300 of the object plane 204 formed by the telescope system 112 in the immediate image space is detected by the optical detection system 114. Then, in step S14 the control unit 106 divides the detected image 300 into the three areas 302, 304, 306 shown in FIG. 3.

In step S16, the control unit 106 evaluates the image quality of the image 300 and the three areas 302, 304, 306 by evaluating a Strehl ratio, a contrast value, an image sharpness measure and/or a width of an autocorrelation function, or any other suitable image quality metric known from prior art, of the image 300 and/or the three areas 302, 304, 306. In particular, the control unit 106 evaluates a direction dependent image quality of the first and seconds areas 302, 304.

In step S18, the control unit 106 adjusts the optical correction means 134 and the optical zoom system 130 based on the evaluation of the image quality in step S16. The adjustments may be performed at the same time or sequentially. The optical zoom system 130 is adjusted such that the magnification of the optical zoom system 130 is adapted to the ratio of the two refractive indices associated with the object side and the image side, respectively. This adjustment is performed in order to correct the defocus aberrations. In the present embodiment, the control unit 106 adjusts the optical zoom system 130 by maximizing the image quality of the first and second areas 302, 304, since the image quality depends mainly on the amount of coma due to the defocus aberration. This can be done in a single step or in an iterative process in which the steps S16 and S18 are repeated until the optical zoom system 130 has been fully adapted. The control unit 106 adjusts the optical correction means 134 in the present embodiment by maximizing the image quality of the third area 306. The third area 306 is less affected by coma due to defocus aberration, so the image quality mainly depends on the spherical aberrations. This can be done in a single step or in an iterative process in which the steps S16 and S18 are repeated until the optical correction means 134 has been fully adapted. The process is then stopped in step S20.

Figure 5:
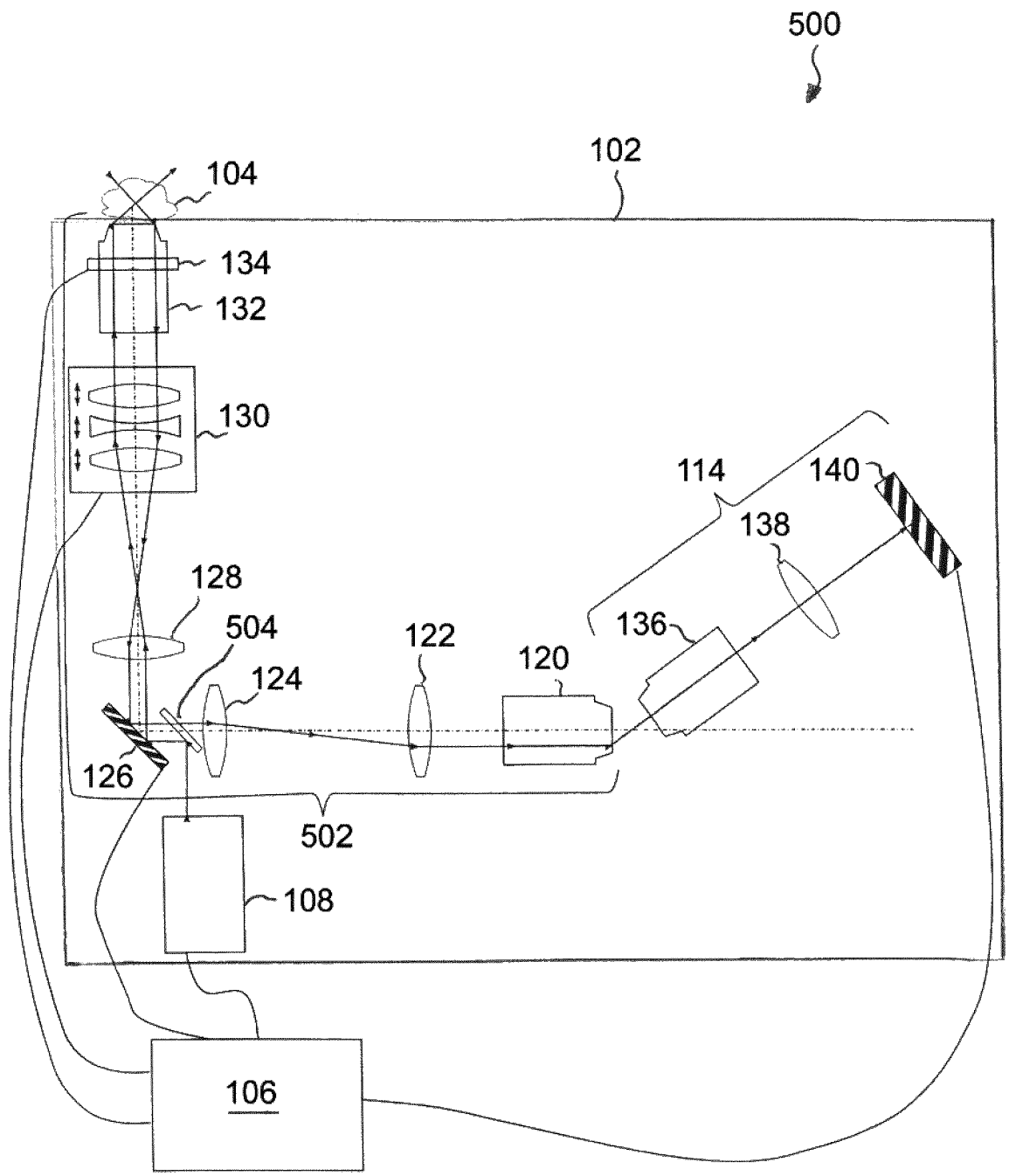
FIG. 5 shows a schematic diagram of an oblique plane microscope according to another embodiment.

FIG. 5 shows a schematic diagram of an oblique plane microscope 500 according to another embodiment. The oblique plane microscope 500 according to FIG. 5 is distinguished from the oblique plane microscope 100 according to FIG. 1 in terms of how the light sheet is coupled into the telescope system 502. Identical or equivalent elements are designated in FIGS. 1 and 5 by the same reference signs.

A telescope system 502 of the oblique plane microscope 100 according to the present embodiment comprises a dichroic beam splitter 504 which is arranged between the scanning element 126 and the first ocular 124. The dichroic beam splitter 504 is configured to reflect the light sheet formed by the illumination system 108 onto the scanning element 126. Further, the dichroic beam splitter 504 is configured to transmit the detection light originating in the object 104 towards the optical detection system 114.

Figure 6:
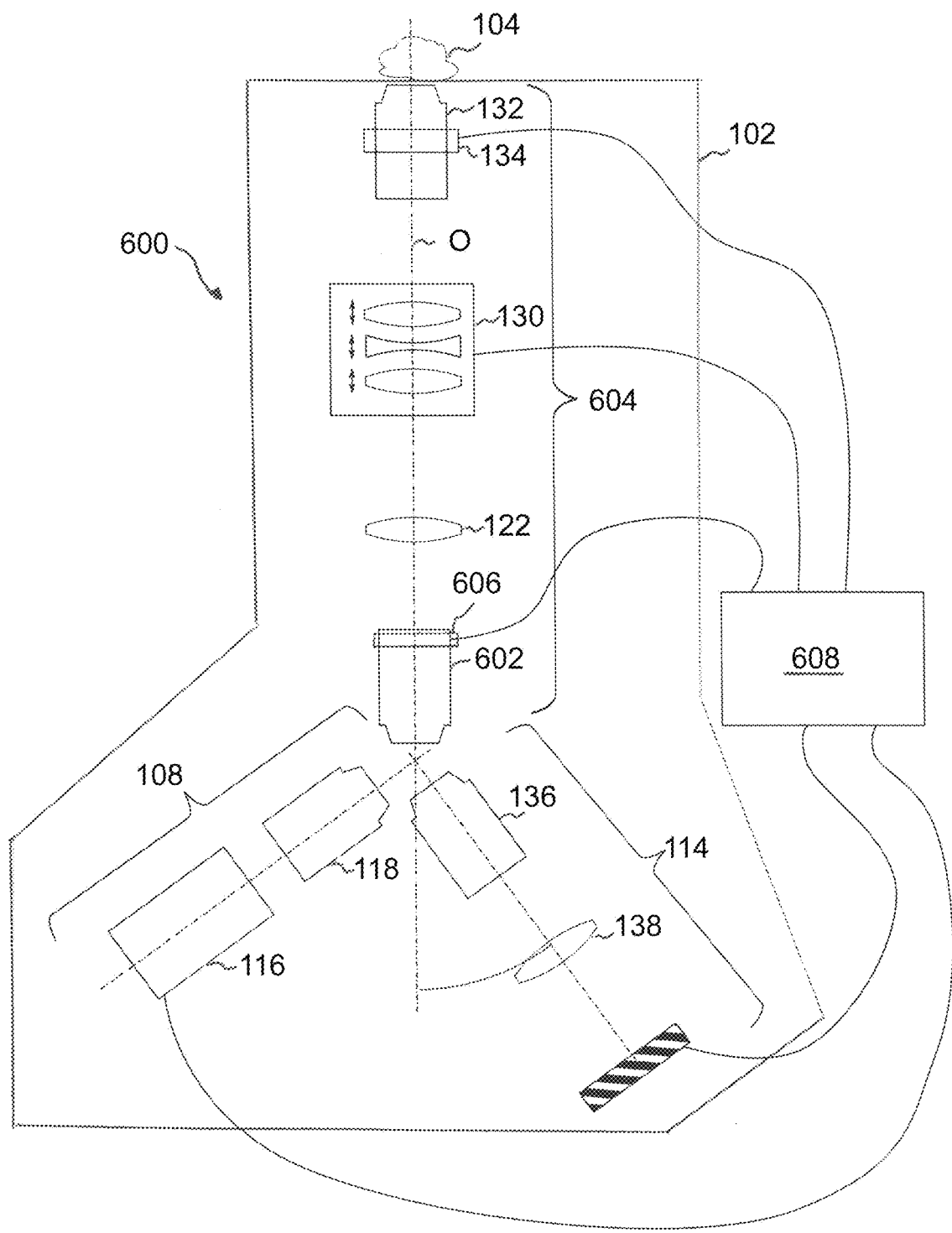
FIG. 6 shows a schematic diagram of an oblique plane microscope according to another embodiment.

FIG. 6 shows a schematic diagram of an oblique plane microscope 600 according to a further embodiment. The oblique plane microscope 600 according to FIG. 6 is distinguished from the oblique plane microscope 100 according to FIG. 1 in that an image side objective 602 of a telescope system 604 comprises adjustable focus means 606. Identical or equivalent elements are designated in FIGS. 1 and 6 by the same reference signs.

The adjustable focus means 606 are controlled by a control unit 608 and configured to be adjustable for adjusting the position of the focal plane 202 along the optical axis O of the objective 132. Since the focal plane 202 can be moved through the object 104 by the adjustable focus means 606, the telescope system 604 according to FIG. 6 does not comprise the scanning elements.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Oblique plane microscope
102 Optical imaging system
104 Object
106 Control unit
108 Illumination system
110 Intermediate image space
112 Telescope system
114 Optical detection system
116 Light sheet forming unit
118, 120 Objective
122 Tube lens
124 Ocular
126 Scanning element
128 Ocular
130 Optical zoom system
132 Objective
134 Correction means
200 Object side end
202 Focal plane
204 Object plane
206, 208, 210 Region
300 Image
302, 304, 306 Area
308 Line
500 Oblique plane microscope
502 Telescope system
504 Dichroic beam splitter
600 Oblique plane microscope
602 Objective
604 Telescope system
606 Focus means
608 Control unit

The invention claimed is:

1. An oblique plane microscope, comprising:
an optical imaging system configured to form an image of an object, the optical imaging system comprising a telescope system with an optical zoom system, which is adjustable for adapting a magnification of the telescope system to a ratio between two refractive indices, one of which being associated with an object side of the telescope system and the other being associated with an image side of the telescope system; and
a control unit,
wherein the telescope system comprises an objective arranged at the object side of the telescope system, wherein the control unit is configured to divide the image formed by the oblique plane microscope into three or more areas, wherein a first area comprises an image of a first region of the object and a second area comprises an image of a second region of the object, wherein the first region is located off of a focal plane of the objective on a first side facing away from the objective, and the second region is located off of the focal plane of the objective on a second side facing the objective, and wherein the control unit is configured to evaluate an image quality only in the first area and/or the second area, and to adjust the optical zoom system based on the evaluation.

2. The oblique plane microscope according to claim 1, wherein a third area comprises an image of a third region of the object, the third region being intersected by the focal plane of the objective.

3. The oblique plane microscope according to claim 2, wherein the telescope system comprises an optical correction apparatus which is adjustable for correcting a spherical aberration of the optical imaging system, and wherein the control unit is configured to evaluate an image quality of the third area of the image and to adjust the optical correction apparatus based on the evaluation of the image quality in the third area.

4. The oblique plane microscope according to claim 3, wherein the control unit is configured to evaluate the image quality of the first area and/or the second area, to evaluate the image quality in the third area, and to adjust the optical correction apparatus and the optical zoom system based on the evaluation of the image quality in the first area and/or the second area and the evaluation of the image quality in the third area in an iterative process.

5. The oblique plane microscope according to claim 1, wherein the control unit is configured to evaluate the image quality by determining a Strehl ratio, a contrast value, an image sharpness measure and/or a width of an autocorrelation function of the image.

6. The oblique plane microscope according to claim 1, wherein the optical zoom system is configured to render the telescope system telecentric contained over an entire magnification range with respect to both the object side and the image side.

7. The oblique plane microscope according to claim 6, wherein the magnification range of the telescope system corresponds to a range in which the ratio of the two refractive indices is between 1.0 and 1.6.

8. The oblique plane microscope according to claim 1, wherein the telescope system is formed by a Keplerian telescope comprising the optical zoom system.

9. A method for correcting an aberration in an oblique plane microscope, the method comprising:

evaluating, by a control unit of the oblique plane microscope, an image quality of an image of an object formed by an optical imaging system of the oblique plane microscope, wherein the optical imaging system comprises a telescope system with an optical zoom system, which is adjustable for adapting a magnification of the telescope system to a ratio between two refractive indices, one of which being associated with an object side of the telescope system and the other being associated with an image side of the telescope system, wherein the telescope system comprises an objective arranged at the object side of the telescope system, wherein the image comprises three or more areas, a first area comprising an image of a first region of the object, and a second area comprising an image of a second region of the object, wherein the first region is located off of a focal plane of the objective on a first side facing away from the objective, and the second region is located off of the focal plane of the objective on a second side facing the objective, wherein the evaluating the image quality comprises evaluating the image quality only in the first area and/or the second area, and adjusting, by the control unit, the optical zoom system of the oblique plane microscope based on the evaluation of the image quality only in the first area and/or the second area.

10. The method according to claim 9, wherein the telescope system comprises an optical correction apparatus which is adjustable for correcting a spherical aberration of the optical imaging system, wherein the image comprises a third area, the third area comprising an image of a third region of the object, the third region being intersected by the focal plane of the objective, the method further comprising:

evaluating, by the control unit, an image quality in the third area, and adjusting, by the control unit, the optical correction apparatus based on the evaluation of the image quality in the third area.

* * * * *